Patented Feb. 9, 1937

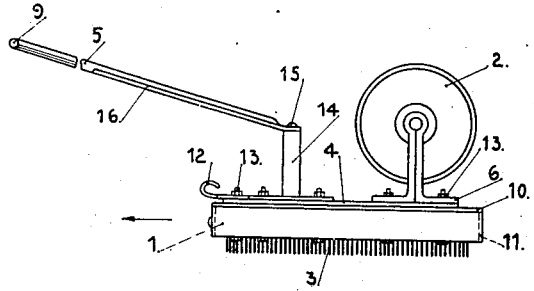
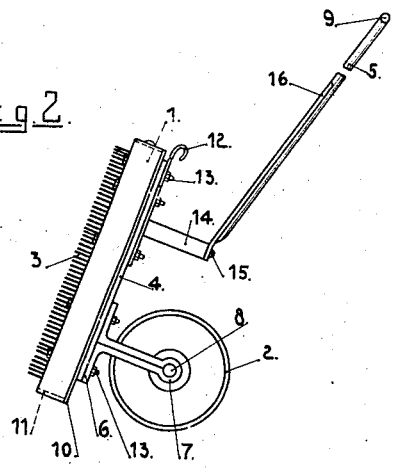
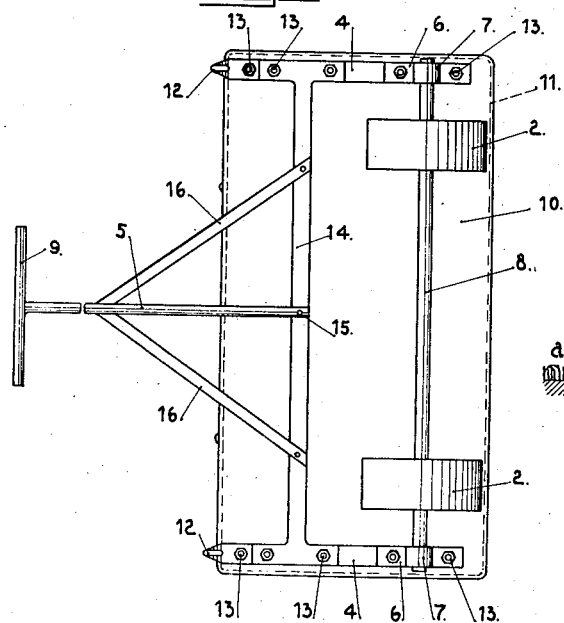
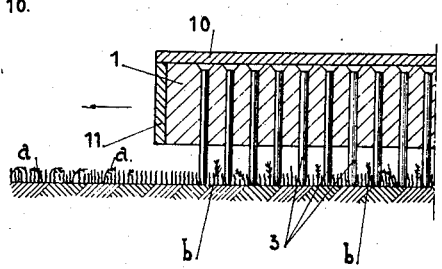

2,069,958

UNITED STATES PATENT OFFICE 2,069,958

IMPLEMENT FOR CONDITIONING LAWNS

Alexander Anthon Diemer Kool, Aerdenhout, Netherlands

Application August 7, 1934, Serial No. 738,836
In Great Britain August 11, 1933

2 Claims. (Cl. 55—10)

My invention relates to an implement for conditioning lawn on grass plots of any kind, for instance, on sporting places such as cricket grounds, golf links, bowling greens, etc.

It is an object of my invention to provide an implement for the purpose specified which sets up the blades of the grass so as to admit light and air to their roots, removes loose and withered blades of grass, leaves, twigs, and other foreign matter, but does neither break up the ground nor damage the roots of the grass.

To this end, I provide an implement which comprises a base plate and blunt spikes distributed over the base plate. In appearance, the implement resembles a harrow but its function is that of a rake as the points of its spikes are blunt and move on the surface of the ground, without penetrating into it.

In the drawing affixed to this specification and forming part thereof an implement embodying my invention and equipped with wheels and a drawbar, is illustrated diagrammatically by way of example.

In the drawing

Fig. 1 is an elevation showing the implement in position for operation,

Fig. 2 is an elevation showing the implement inverted and running on its wheels, Fig. 3 is a plan view of Fig. 1, Fig. 4 is a section drawn to a larger scale and showing a portion of the base plate with the spikes and the means for holding them.

Referring now to the drawing, and first to Figs. 1 to 3, the base plate 1 which supports the blunt spikes 3, is preferably made of wood and may be of rectangular shape, as shown in Fig. 3. It is equipped with a top plate 10 which may be of sheet metal, and surrounded by a frame 11 which may be of the same material. Metal strips 4 are secured to the top plate 10 at opposite sides thereof and held by means such as screws 13. The implement is intended to move in the direction of the arrow in Fig. 1. 14 is a bracket which is arranged at the rear of the leading edge. The ends of the bracket are placed on the strips 4, and held by four of the screws 13. A drawbar 5, with a handle 9, is attached to the bracket 14 at 15 and braced by a pair of members 16. Two more brackets 6 are supported on the strips 4 near the trailing edge of the implement and held by four screws 13. 7 are bearings on the brackets 6 for supporting an axle 8 on which two wheels 2 are fixed. Draw hooks 12 may be placed on the strips 4 in front of the ends of bracket 14, and held by two screws 13.

Referring now to Fig. 4, the spikes 3 may be nails whose sharp points have been removed. The nails are driven into and through the base plate 1 which, in this case, is a board, from above, but obviously this is only one way of fixing the spikes, as they might as well be inserted in holes drilled in the plate 1. The top plate 10 is placed on the heads of the nails or spikes 3, and the frame 11 is placed about the sides of the plate 1 and secured by screws (not shown). Obviously, the blunt ends of the nails or spikes 3 should be substantially in the same plane. The top plate 10 positively holds down the heads of the nails or spikes 3.

By way of example, the base plate or board 1 may be made of elm wood, and may be 39⅜ in. long, 21⅝ in. wide, and 2⅜ in. thick. The nails or spikes 3 may be pitched as desired; in the base plate referred to the pitch is such that 110 spikes are positioned in an area whose sides are spaced inwardly from the sides of the base plate for 1¾ to 2 in. The spikes are so long that their lower ends project from the lower face of the plate 1 for about 2⅜ in. The frame 11 is about ⅜ in. thick, and the top plate 11 may be of the same thickness.

An implement of this size weighs about 175 lbs. The weight of the implement is thus about 0.2 pound per square inch of the operating surface; that is, the surface provided with spikes. The number of the spikes used and their spacing is such that they merely move over the surface of the ground without penetrating it and without damaging the roots of the grass.

In operation, the implement is wheeled to the beginning of the lawn, where it is turned over and dragged over the lawn, so that the spikes 3 set up the blades of the grass. At the end of the lawn the implement is turned over onto its wheels and wheeled in position to treat on the return journey a second strip adjacent to the first, after having been again turned over. This operation is continued until the entire lawn has been treated.

In a preferred way of using the implement the lawn is treated first lengthwise and then crosswise. The action of the implement on the blades of the grass is shown in Fig. 4, it being assumed that the implement is drawn along in the direction of the arrow.

By means of my improved implement a lawn is rapidly and efficiently conditioned or prepared for mowing. Since many spikes 3 are distributed over the area which is spaced from the sides of the base plate 1, as described, the weight carried by each individual spike is small, and so the spikes have no tendency to penetrate into the ground, apart from the bluntness of their ends. The spikes, therefore, do not act like incision tools and do not damage the roots of the grass while setting up the blades, admitting light and air and removing foreign matter, as described.

The action of a mowing machine is not quite uniform, and it will always leave some blades which are longer than those which have been cut to the proper length. Some such long blades are shown at $a$ in Fig. 4. The action of the implement according to my invention is to straighten these blades, as at $b$, preparatory to mowing. Blades extending in another direction are set up at the subsequent crosswise treatment.

The treatment with the implement according to my invention results in the grass being strengthened. Continuous treatment will result in a thicker sod, whereby the growth of weeds is impeded.

The weight and dimensions of the implement may be varied according to circumstances so as to produce an optimum effect on the grass. Additional drawing means may be connected to the hooks 12.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An implement for conditioning lawns by dragging comprising in combination, a large and heavy base plate, a great number of short rigid spikes with blunt ends projecting from one side of and distributed substantially all over said base plate in closely spaced relation, the number and spacing of said spikes being such that they merely move over the surface of the ground without penetrating the same to set up the blades of grass without damaging the roots of the grass, and means for moving said implement over the lawn.

2. An implement for conditioning lawns by dragging which comprises a large and heavy base plate, a large number of short, closely spaced, rigid spikes having blunt ends projecting from one side of said base plate, the number and spacing of said spikes being such that they merely move over the surface of the ground without penetrating the same to set up the blades of grass without damaging the roots of the grass, the weight of said implement per square inch of spiked surface amounting to about 0.2 pound.

ALEXANDER ANTHON DIEMER KOOL.